(12) United States Patent
Misiewicz et al.

(10) Patent No.: US 11,928,158 B2
(45) Date of Patent: Mar. 12, 2024

(54) IDENTIFICATION OF EMERGING CLUSTERS

(71) Applicant: Yext, Inc, New York, NY (US)

(72) Inventors: Michael Misiewicz, Brooklyn, NY (US); Michael Peralta, Brooklyn, NY (US); Maxwell Shaw, Manhattan, NY (US)

(73) Assignee: YEXT, INC., New York, NY (US)

( * ) Notice: Subject to any disclaimer, the term of this patent is extended or adjusted under 35 U.S.C. 154(b) by 53 days.

(21) Appl. No.: 17/190,032

(22) Filed: Mar. 2, 2021

(65) Prior Publication Data
US 2022/0138258 A1    May 5, 2022

Related U.S. Application Data

(63) Continuation-in-part of application No. 17/083,894, filed on Oct. 29, 2020.

(51) Int. Cl.
*G06F 16/906* (2019.01)

(52) U.S. Cl.
CPC .................. *G06F 16/906* (2019.01)

(58) Field of Classification Search
CPC ...... G06F 16/906; G06F 16/367; G06F 16/35; G06F 16/285; G06F 16/00
See application file for complete search history.

(56) References Cited

U.S. PATENT DOCUMENTS

| | | |
|---|---|---|
| 8,145,623 B1 | 3/2012 | Mehta et al. |
| 8,688,704 B1 | 4/2014 | Horling et al. |
| 9,767,165 B1 * | 9/2017 | Tacchi .................. G06F 16/345 707/737 |
| 10,496,691 B1 * | 12/2019 | Chen ....................... G06F 16/35 707/737 |
| 11,226,992 B1 | 1/2022 | Ramsey et al. |

(Continued)

OTHER PUBLICATIONS

PCT Notification of Transmittal of the International Search Report and the Written Opinion of the International Searching Authority for PCT Application No. PCT/US2021/057101, dated Feb. 10, 2022, 14 pages.

*Primary Examiner* — Yuk Ting Choi
(74) *Attorney, Agent, or Firm* — Jeffri A. Kaminski; Venable LLP

(57) ABSTRACT

A system and method to generate and manage clusters of search terms. A cluster generation process is executed at a first time to generate a first set of clusters including respective sets of search terms. At least one of a first value of a first parameter associated with the first set of clusters or a first value of a second parameter associated with the first set of clusters is determined. At a second time, the cluster generation process is executed to generate a second set of clusters. At least one of a second value of the first parameter associated with the second set of clusters or a second value of the second parameter associated with the second set of clusters is determined. A determination is made whether either the second value of the first parameter satisfies a first condition or the second value of the second parameter satisfies a second condition. The system and method identify an emerging cluster within the second set of clusters in response to satisfaction of either the first condition or the second condition. Information identifying the emerging cluster is displayed via a user interface.

12 Claims, 10 Drawing Sheets

(56) References Cited

U.S. PATENT DOCUMENTS

| | | |
|---|---|---|
| 2003/0144994 A1 | 7/2003 | Wen |
| 2008/0120292 A1 | 5/2008 | Sundaresan |
| 2008/0243817 A1 | 10/2008 | Chan |
| 2016/0063590 A1* | 3/2016 | Subramanya ...... G06Q 30/0623 705/26.61 |
| 2018/0032606 A1* | 2/2018 | Tolman ................ G06F 16/951 707/737 |
| 2018/0196795 A1* | 7/2018 | Beller .................. G06F 40/284 707/999.003 |
| 2019/0087497 A1* | 3/2019 | Chan .................... G06F 16/955 707/737 |
| 2020/0012744 A1* | 1/2020 | Shults .................. G06F 16/954 707/999.003 |
| 2021/0026858 A1 | 1/2021 | Jauhari |
| 2021/0191995 A1* | 6/2021 | Bennett ................ G06F 16/313 707/737 |
| 2021/0281593 A1 | 9/2021 | Liu |

\* cited by examiner

IDENTIFICATION OF EMERGING CLUSTERS

CROSS-REFERENCE TO RELATED APPLICATION

This application is a continuation-in-part of U.S. Non-provisional application Ser. No. 17/083,894, filed Oct. 29, 2020, titled "Management and Optimization of Search Term Clustering", the entire disclosure of which is incorporated herein by this reference.

TECHNICAL FIELD

Embodiments of the disclosure are generally related to search term management, and more specifically, are related to generating and managing of emerging or trending clusters of search terms for display and analysis.

BACKGROUND

Conventionally, an end user may conduct a search for information about an entity (e.g., a merchant, a person, etc.) using a third party search engine (e.g., Google™, Bing™ Yahoo!™ Search), a third-party platform (e.g., Yelp™, YouTube™, etc.), or a first party search engine (e.g., a search engine associated with the entity). The various search platforms provide the end user with information in response to the input of a search query.

In addition, the search queries submitted by the multiple end users provide valuable information to the entity. In this regard, an entity may wish to accumulate and analyze the submitted search queries to identify areas of interest, information gaps, and better service and provide information to the entity's end users.

However, conventional approaches to analyzing and organizing search queries are limited. In particular, the search data includes a vast number of unique search terms, making it challenging to organize the search data in a manner that enables the filtering of corresponding noise and the identifying of actionable insights associated with the search data. In particular, due to combinatorics, as the length of a sequence of words from a vocabulary (e.g., words in a language) increases, the number of possible sentences that could be constructed also increases. As such, it becomes increasingly difficult for a human to review all of these unique combinations of words. Furthermore, conventional search data analysis fails to enable an entity's end users the ability to identify trends corresponding to changing importance or priority of searches relating to entity data.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
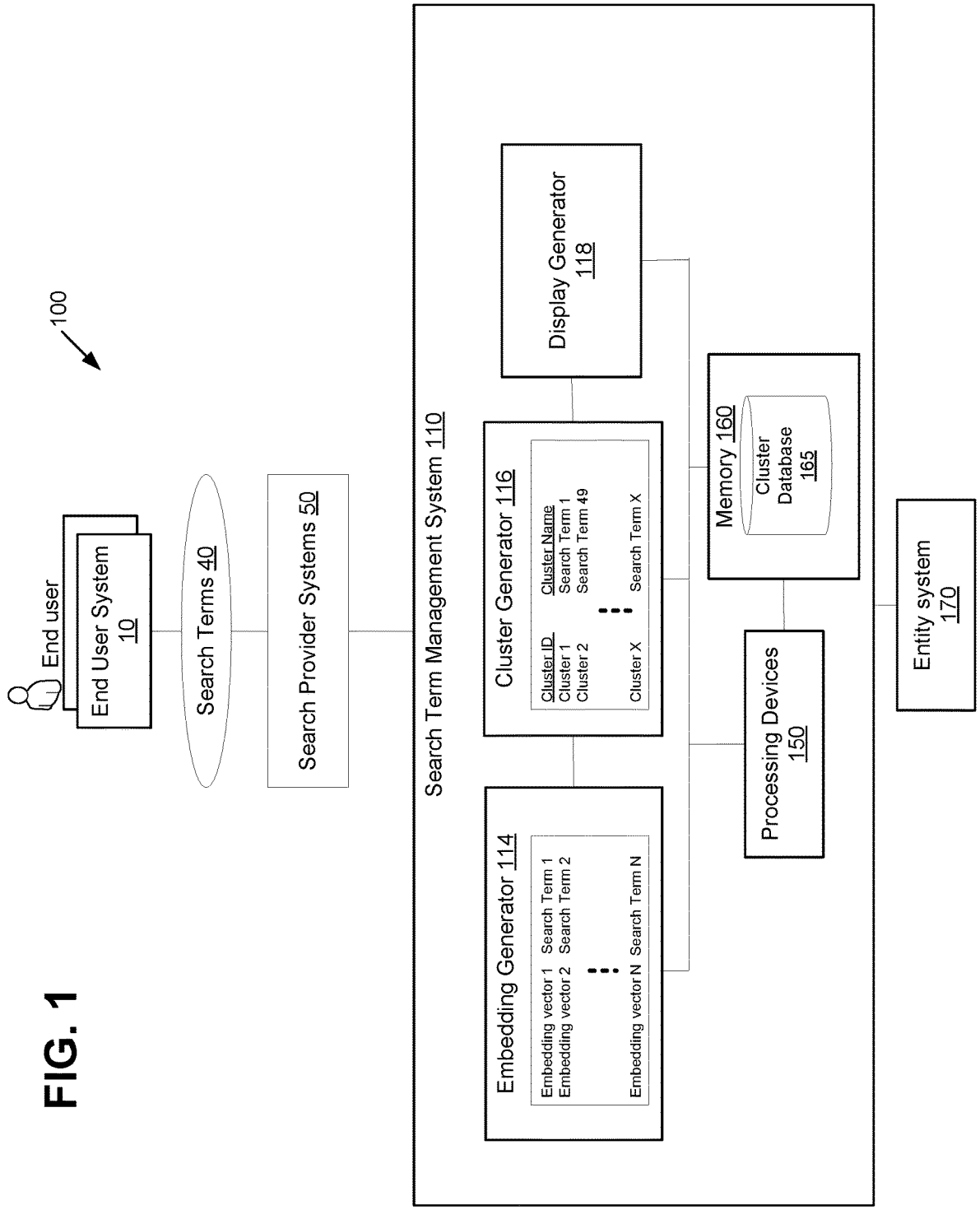
FIG. 1 illustrates an example of a computing environment including a search term management system to process and manage search terms, in accordance with one or more aspects of the disclosure.

Aspects of the present disclosure are directed to collecting search query data, identifying search terms and generate clusters of related search terms to enable the identification of search query patterns and trends. The collection of search terms are analyzed to identify similar or related search terms and generate multiple clusters of the sets of related search terms. The generated clusters can be analyzed to determine an associated noise rate and cluster size (i.e., a cluster size is defined by a number of different search terms that are included in a cluster). In an embodiment, a cluster can be identified or filtered in response to determining that the cluster is associated with a noise rate that exceeds a noise rate threshold level (also referred to as a "noisy" cluster). In an embodiment, a cluster can be identified or filtered in response or determining that the cluster has a cluster size that exceeds a cluster size threshold level (also referred to as an "overlarge" cluster). In an embodiment, data relating to the identification of noisy or overlarge clusters can be used to refine or update the cluster generation process to iteratively improve further generated clusters to reduce the instances of noisy and overlarge clusters.

Advantageously, the generated clusters of associated search terms (also referred to as "cluster data") relating to an entity (e.g., a company, a person, an organization, etc.) can be provisioned to a system associated with the entity to enable the entity to review, analyze and search the cluster data to identify one or more parameters (e.g., search trends, information gaps, search engine response rates, session data, search data (e.g., numbers of searches related to a cluster or the component search terms), etc. In addition, the number of generated clusters can be reduced and refined by removing clusters that are identified as noisy, overlarge, or both from the cluster data that is presented to an entity system.

Embodiments of the disclosure address the above-mentioned problems and other deficiencies with current search query technologies by aggregating search query data associated with an entity in connection with online search queries submitted by multiple end users (e.g., a user conducting a search relating to the entity) via one or more search provider systems (e.g., search website, applications, etc.). Component search terms of the collected search query data are identified and processed by a neural network to generate a corresponding embedding vector. Comparing the embedding vector corresponding to each of the respective search terms enables the generation of clusters including sets of component search terms (e.g., search terms that have embedding vectors that satisfy matching criteria).

Advantageously, the set of generated clusters can be analyzed to identify one or more clusters that have a level of noise that exceeds a threshold noise level (also referred to as a "noisy" cluster). For example, a cluster can be identified as having an unacceptable level of noise if the cluster is distanced from other clusters at a distance that exceeds a threshold distance as determined by a clustering algorithm.

Furthermore, the set of generated clusters can be analyzed to identify one or more clusters that have a size that exceeds a threshold cluster size level (also referred to as an "overlarge" cluster, an "invalid-sized" cluster or an "acceptable-sized" cluster). An overlarge cluster or cluster having an invalid or unacceptable size can be identified in response to the identification of associated embeddings that are of a poor quality. In an embodiment, for a given search query, the embedding vector can be of a small magnitude, i.e. all dimensions of the vector are close to zero). For example, an overlarge cluster can be composed of keyword queries (e.g., "cars", "shoes", "computer", etc.) that have little discernible semantic content, and agglomerate into one big cluster (e.g., an overlarge cluster).

In an embodiment, the noisy and overlarge clusters can be removed or filtered from cluster data that is provisioned to a system associated with the entity (herein the "entity system"). The identified clusters can be presented to the entity system with cluster data including information relating to parameters of the clusters (e.g., session data, click through rate data, results data, etc.) relating to each cluster and the associated search term components of the respective clusters. The cluster data is presented to an entity to allow the entity to identify the parameters associated with aggregated search data associated with multiple end user searches to enable the entity to analyze the type of knowledge or information about the entity (e.g., merchant information, product information, service information, etc.) to refine, adjust, or adapt one or more knowledge search features (also referred to as "answers") to enable an improved searching experience. Knowledge can be defined as "facts" or data regarding a subject that can be stored in an indexed database that is searchable in response to an end user search query.

FIG. 1 illustrates an example computing environment 100 including a search term management system 110 communicatively connected to one or more search provider systems 50 to collect search terms 40 relating to search queries relating to an entity submitted by one or more end user system 10, according to embodiments of the present disclosure. In one embodiment, the search term management system 110 can be integrated or embedded within one or more entity systems 170 (e.g., systems that are managed by an entity for which search terms are collected) or one or more search provider systems 50 (e.g., a third party search engine (e.g., Google™, Bing™ Yahoo!™ Search), a third-party platform (e.g., Yelp™, YouTube™, etc.), or a first party search engine (e.g., a search engine associated with the entity). In an embodiment, the search term management system 110 can be a standalone system that is accessible by one or more computing devices of the entity system 170. As shown in FIG. 1, the search term management system can include a memory 160 to store instructions associated with the operations, features and functionality described herein and one or more operatively coupled processing devices 150 to execute the instructions. The memory 160 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions and data.

As used herein, the term "end user" refers to one or more users operating an electronic device (e.g., end user system 130 such as a mobile phone, tablet, laptop, desktop, etc.) to submit a search query including one or more search terms 40 associated with an entity (e.g., a merchant or other entity associated with the entity system 170) for processing by a search provider system 50. The search provider systems 50 are configured to provision search results to the end user system 10 in response to the search query.

In embodiments, the search term management system 110 can include one or more software and/or hardware modules, including an embedding generator 114, a cluster generator 116, a display generator 118, the one or more processing devices 150, and the memory 160. In one embodiment, the components or modules of the search term management system 110 may be executed on one or more computer platforms that are interconnected by one or more networks, which may include the Internet. The components or modules of the search term management system 110 may be, for example, a hardware component, circuitry, dedicated logic, programmable logic, microcode, etc., that may be implemented in the processing device of the search term management system 110 to execute the features and functionality described herein.

In an embodiment, the embedding generator 114 collects the search terms 40 submitted by the end user systems 10 via the one or more search provider systems 50. In an embodiment, the embedding generator 114 collects all of the search terms that have been submitted as part of search queries during a period of time (also referred to as a "search term collection period"). For example, the search term collection period can be any range of days, such as, for example, 30 days, 60 days, 120 days, etc.

In an embodiment, the embedding generator 114 generates an embedding vector for each of the collected search terms. In an embodiment, the embedding vector is a unique numerical representation of the search term. Accordingly, the embedding generator 114 generates a unique embedding vector associated with each respective search term of the set of collected search terms. In an embodiment, the embedding generator 114 includes a neural network configured to execute a neural network-based process for natural language processing of the search terms to determine a context of the collected search terms to generate the associated embedding vectors.

According to an embodiment, the embedding vectors for each search term can be generated using a neural network or machine learning system configured to employ a library for learning term embeddings and term classifications to create an unsupervised or supervised learning algorithm to generate the vector representations for the search terms. The embedding generator 114 can include a neural network or machine learning system such as, for example, a bidirectional encoder representations (BERT) system, a fastText system, a Word2Vec system, a Healthcare Word2Vec system, etc. The vector representation of each search term can be compared to identify a cluster including a set of search terms having similar vector representations (e.g., vector representations that are within a range, tolerance, or threshold in comparison to one another). In an embodiment, each of the collected search terms is run through the embedding generator 114 to produce a corresponding embedding vector.

In an embodiment, the cluster generator 116 is configured to execute a clustering algorithm or process based on the set of embedding vectors received from the embedding generator 114. In an embodiment, the cluster generator 116 generates one or more clusters based on a comparison of the embedding vectors. In an embodiment, each cluster includes a set of search terms that satisfy a matching condition based on the corresponding embedding vectors. The cluster generator 116 can employ a suitable clustering process, such as, for example, a density-based spatial clustering of applications with noise (DBSCAN) clustering process. In an embodiment, the cluster generator 116 uses a set of points in space (e.g., points of the embedding vectors) and groups points that are closely packed together (e.g., points of the embedding vectors with a threshold number of neighboring points within a certain "nearby" or neighboring range), marking as outliers points that lie alone in low-density regions (e.g., points having a nearest neighbor that are too far away (e.g., outside of the neighboring range).

In an embodiment, the cluster generator 116 can be configured to consider a set of points in a space to be clustered, where epsilon ($\varepsilon$) (e.g., epsilon=7) is a parameter specifying the radius of a neighborhood with respect to some point. In an embodiment, the points are classified as core points, (density-)reachable points and outliers, as follows: a point p is a core point if at least a threshold number of minPts points (e.g., minPts=3) are within distance $\varepsilon$ of the point (including point p). In an embodiment, the cluster generator 116 identifies a point q as directly reachable from p if point q is within distance $\varepsilon$ from core point p, wherein points are identified as directly reachable from core points. In an embodiment, the cluster generator 116 identifies a point q as reachable from p if there is a path p1, . . . , $p_n$ with p1=p and $p_n$=q, where each $p_i$+1 is directly reachable from $p_i$. In an embodiment, the cluster generator 116 further identifies one or more points that are not reachable from any other point are outliers or noise points. In an embodiment, the cluster generator 116 forms a cluster associated with p as the core point including all points (core or on-core) that are reachable from it. In an embodiment, each cluster contains at least one core point and non-core points can form an "edge" of a cluster, since those points cannot be used to reach more points.

In an embodiment, the cluster generator 116 identifies one or more noise points (N) that is neither a core point nor directly reachable. In an embodiment, the cluster generator 116 can establish a noise cluster rate threshold level for the generated clusters. The number of queries classified as noise is a function of the minPts and epsilon parameters. minPoints is the number of points (queries) in vector space that are within distance epsilon of each other to start a cluster. For example, if minPts is 10, then it is necessary to have at least 10 queries within distance epsilon to form a new cluster. In another example wherein there are 9 points within distance epsilon of each other, all 9 of these queries are classified as noise and discarded from any further processing. To produce a useful output for users, the number of queries assigned to the noise cluster is minimized, since the point is to group semantically similar items for further review. In an embodiment, the epsilon and minPts parameters are set to enable a balance producing clusters of a valid or acceptable size (e.g., clusters that are non overlarge or overinclusive and include queries that are not semantically related) which minimizes noise (e.g., such that too many queries do not become noise).

In an example, an entity may have 10,000 unique search queries associated with the entity during a time period. A clustering process can be executed with respect to the 10,000 search queries with the source of the embedding vectors held as a constant. In an embodiment, the number of queries as noise and the number of queries in overlarge clusters is compared. For example, the process can identify the following example candidate permutations of parameters:

eps 5, minPts 10→noise 8000 queries, overlarge 500 queries eps 7, minPts 3→noise 4000 queries, overlarge 1000 queries, eps 21, minPts 2→noise 100 queries, overlarge 9500 queries In this example, an optimal balance between the epsilon and minPts is identified as eps 7, minPts 3.

In an embodiment, the cluster generator 116 can establish a cluster size threshold level by controlling and establishing the $\varepsilon$ and minPts parameter values, as described above. In an embodiment, the cluster size threshold level can be used to identify clusters that are considered "overlarge". In an embodiment, an overlarge cluster is identified as a cluster having a size that exceeds the cluster size threshold level. In an embodiment, the cluster size threshold level can be set to, for example, 100 search terms. In this example, a cluster including greater than 100 search terms is identified as an overlarge cluster. In an embodiment, the cluster generator 116 identifies the one or more noisy clusters (e.g., clusters having a noise rate that exceeds the noise rate threshold) and one or more overlarge clusters (e.g., clusters having a size that exceeds the cluster size threshold level) and can mark, flag, filter or remove those clusters.

In an embodiment, the cluster generator 116 can assign a name or other identifier to each of the generated clusters. In an embodiment, the cluster name can include the search term that has the highest number of user sessions associated with it as compared to the other search terms in the cluster. For example, for a cluster including Search Term 1, Search Term 2, and Search Term 3), the cluster can be named "Search Term 2" if Search Term 2 is associated with a higher number of sessions than Search Term 1 and Search Term 3. In an embodiment, if multiple search terms have a same level of popularity (as measured by the number of sessions), the cluster name can be selected based on the alphabetical order of the multiple search terms. In an embodiment, the cluster can be named based on a word that is in common among all the search terms of the cluster. In another embodiment, the cluster name can be identified based on a shortest related query. For example, for a cluster composed of the search terms "cars", "cars for sale" and "car dealership", the cluster can be named "cars".

In an embodiment, the cluster generator assigns a unique cluster identifier (ID) for each cluster (e.g., a unique string of alphanumeric characters), a cluster name (e.g., a search term of the cluster associated with the highest relative number of sessions), a label or identifier if the cluster is identified as a noisy cluster (if applicable), a label or identifier identified whether the cluster is an overlarge cluster (if applicable).

In an embodiment, the clusters generated by the cluster generator 116 can be stored in a storage location, such as a cluster database 165 of memory 160. In an embodiment, the display generator 118 can use the stored cluster data to generate one or more displays or interfaces for provisioning to the entity system 170. In an embodiment, the display generator 118 provides controls to enable the entity system 170 to customizing the interface and the one or more parameters presented in connection with the cluster data.

Figure 2:
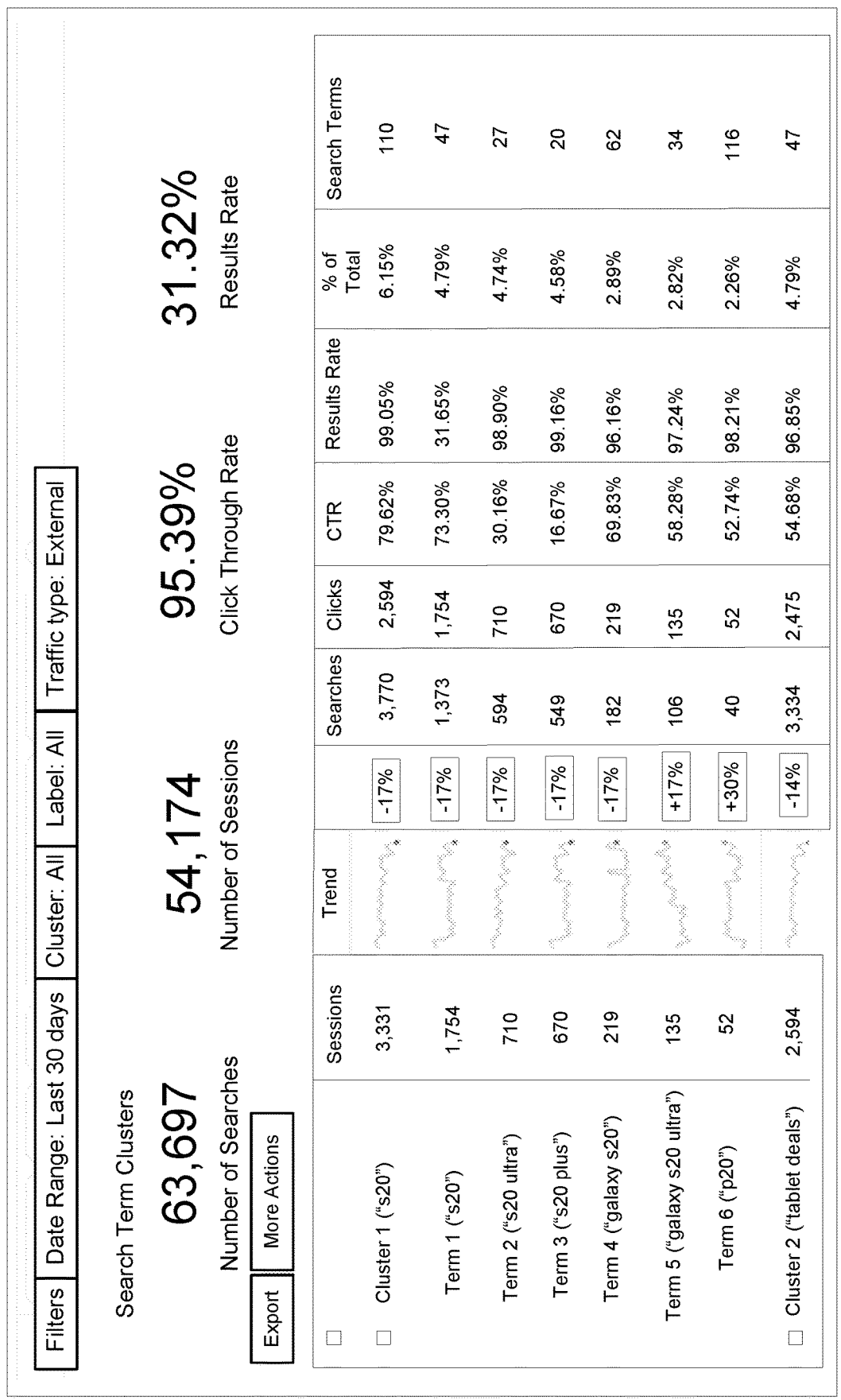
FIG. 2 illustrates an example interface of a search management system including generated clusters and associated cluster metrics, in accordance with one or more aspects of the disclosure.
Figure 3:
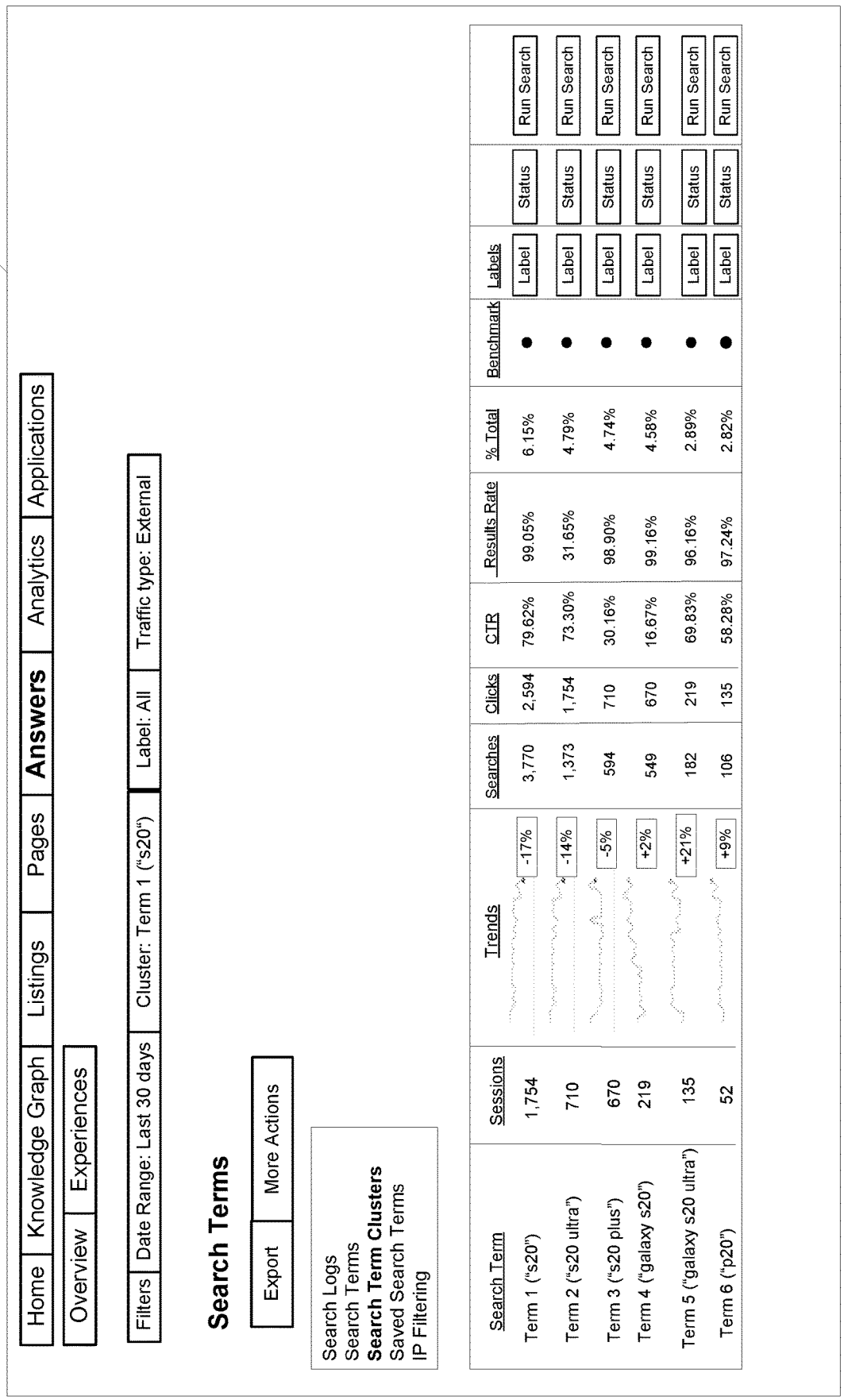
FIG. 3 illustrates an example interface of a search term management system including data associated with a selected cluster of search terms, in accordance with one or more aspects of the disclosure.

FIGS. 2 and 3 illustrate example interfaces 200 and 300 generated by the display generator 118, according to embodiments of the present disclosure. FIG. 2 illustrates the example interface 200 including information associated with two generated clusters (e.g., the "s20" cluster or Cluster 1 and the "tablet deals" cluster or Cluster 2). As shown, the interface 200 can be configured to present different metrics or parameters of the cluster information including, for example, a number of searches that form the set of search queries from which the search terms were identified, a number of user sessions associated with the search queries, a click through rate associated with the identified clusters, a results rate associated with the identified clusters (e.g., a percentage of search queries for which a responsive search result was provided), a percentage of the total sessions (e.g., a percentage of sessions associated with a particular search term over the total number of sessions), a search terms metric which represents a distinct count of normalized search terms, a trend associated with each search term (e.g., a rate of change of frequency of the search term during the identified date range) as illustrated graphically and by a percentage change).

In the example shown in FIG. 2, the interface 200 displays information relating to an identified data range (e.g., the previous 30 days) and includes search terms and session information relating to an entity during that time period. In an embodiment, the interface 200 can be generated to display a ranked list of the clusters (e.g., showing a top ten list of clusters based on one or more of the metrics (e.g., number of searches, number of sessions, click through rate, results rate, etc.). In an embodiment, the entity system 170 can interact with the interface 200 to export a set of cluster data (e.g., export to a file) based on one or more metrics or criteria that is customizable by the entity system (e.g., generated an exported file including a top ten clusters based on the number of sessions metric for the identified date range).

In an embodiment, the interface 200 can be generated to include clusters and metric data associated with one or more clusters that have a noise rate that satisfy a first condition (e.g., the cluster has a noise rate that is less than a noise rate threshold level) and one or more clusters that have a cluster size that satisfy a second condition (e.g., the cluster includes a number of search terms that is less than a cluster size threshold level). In this regard, in an embodiment, the interface 200 can be generated to filter out or remove clusters and metric data associated with one or more clusters that have a noise rate that fails to satisfy the first condition (e.g., the cluster has a noise rate that exceeds the noise rate threshold level) and one or more clusters that have a cluster size that fails to satisfy the second condition (e.g., the cluster includes a number of search terms that exceeds the cluster size threshold level)

As noted above, FIG. 3 illustrates an example interface 300 including cluster information associated with a particular cluster (e.g., Cluster: Term 1 ("s20"). As shown, the selected cluster includes a set of search terms (e.g., Term 1 ("s20"), Term 2 ("s20 ultra"), Term 3 ("s20 plus"), Term 4 ("galaxy s20"), Term 5 ("galaxy s20 ultra"), and Term 6 ("p20"). As shown, the identified cluster is assigned the name of "s20" based on the component search term "s20" having a highest relative value for one or more of the metrics (e.g., the number of sessions metric). As shown, the metric data associated with the selected cluster can be presented based on search activity by end users (via one or more search provider systems) during an identified date range (e.g., a selected 30 day period).

In an embodiment, the display generator 118 generates a filter bar to enable filtering of the cluster data in accordance with inputs and indications received from the entity system 170. For example, the filters can be used by a user of the entity system 170 to select or identify one or more cluster metrics generated by the search term management system to include in the display of the interface.

Figure 4:
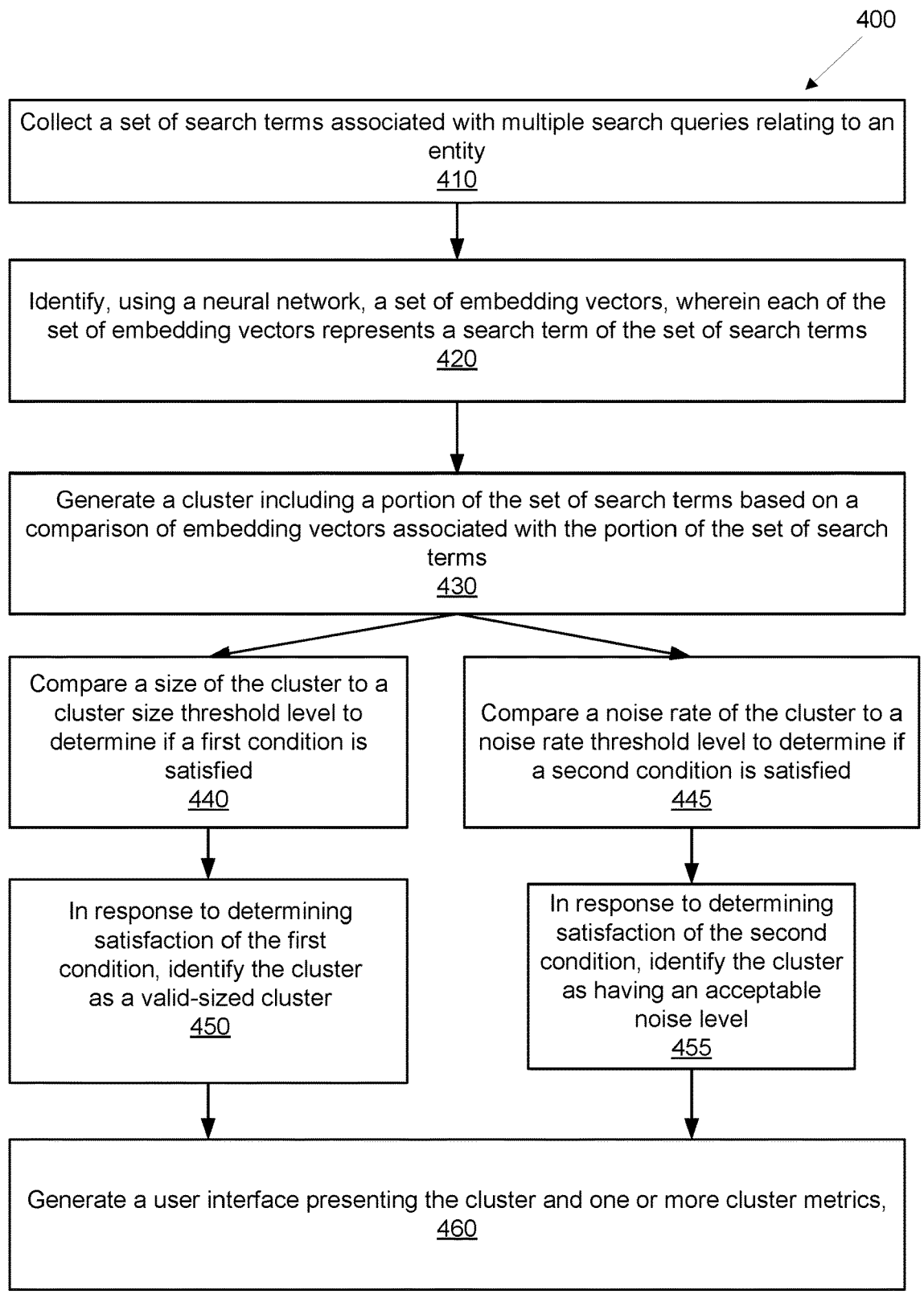
FIG. 4 illustrates an example method to generate an interface including identified cluster and associated cluster metrics, in accordance with one or more aspects of the disclosure.

FIG. 4 illustrates a flow diagram relating to an example method 400 including operations performed by a search term management system (e.g., search term management system 110 of FIG. 1), according to embodiments of the present disclosure. It is understood that the flowchart of FIG. 4 provides an example of the many different types of functional arrangements that may be employed to implement the operation of the notification management component as described herein. Method 400 may be performed by a processing logic that may comprise hardware (e.g., circuitry, dedicated logic, programmable logic, microcode, etc.), software (e.g., instructions run on a processing device), or a combination thereof. In one embodiment, the search term management system executes the method 400 to identify a cluster of associated search terms that satisfies size and noise conditions for integration and display via a user interface associated with an entity system.

In operation 410, the processing logic collects a set of search terms associated with multiple search queries relating to an entity. In an embodiment, the set of search terms can be collected from multiple different end user sessions and searches that are processed by one or more different search provider systems. In an embodiment, the collected set of search terms can relate to searches performed with regard to the entity during an identified time period. In an embodiment, the set of search terms can be periodically collected from the one or more search provider systems (e.g., web-based search engines or web applications wherein a search for information relating to the entity can be performed).

In operation 420, the processing logic identifies, using a neural network, a set of embedding vectors, wherein each of the set of embedding vectors represents a search term of the set of search terms. In an embodiment, the processing logic executes a neural network to process each search term and generate a corresponding embedding vector. Accordingly, in an example, for a set including 12,000 search terms, the processing logic generates 12,000 embedding vectors.

In operation 430, the processing logic generates a cluster including a portion of the set of search terms based on a comparison of embedding vectors associated with the portion of the set of search terms. For example, the processing logic is configured to execute a clustering algorithm or process that clusters or groups the portion of the set of search terms that have embedding vectors that satisfy applicable matching conditions or criteria.

In operation 440, the processing logic compares a size of the cluster to a threshold cluster size to determine if a first condition is satisfied. In an embodiment, the size of the cluster is measured as a number of search terms in the cluster. In an embodiment, the first condition is satisfied if the size of the cluster is less than a cluster size threshold level. In an embodiment, the cluster size threshold level can be a preset number of search terms that represent an acceptable or valid sized cluster. In an embodiment, the cluster size threshold level can be adjustable to a suitable number or size. For example, the cluster size threshold level may be 100 search terms. In this example, the first condition is determined to be satisfied if the cluster includes less than 100 search terms.

In operation 450, in response to determining satisfaction of the first condition, the processing logic can identify the cluster as a valid-sized cluster (e.g., a cluster having a permissible size that is less than the cluster size threshold level).

In an embodiment, the processing logic can further determine if the first condition is not satisfied (e.g., the cluster size is greater than or equal to the cluster size threshold level). In this example, in response to determining the first condition is not satisfied (e.g., the cluster is an overlarge cluster), the processing logic can mark or flag the cluster as overlarge and filter the overlarge cluster from subsequent interfaces generated for display to the entity system.

In operation 445, the processing logic compares a noise rate of the cluster to a noise rate threshold level to determine if a second condition is satisfied. In an embodiment, the second condition is satisfied if the noise rate of the cluster is less than the noise rate threshold level. In an embodiment, the noise rate threshold level can be a preset or adjustable noise level that represent an acceptable or valid noise rate for a cluster.

In operation 455, in response to determining satisfaction of the second condition, the processing logic can identify the cluster as having an acceptable noise level (e.g., a cluster having a noise level that is less than the noise rate threshold level which is deemed acceptable). It is noted that operations 440 and 445 and operations 450 and 455 can be performed in series, in parallel, and in any suitable order.

In an embodiment, the processing logic can further determine the second condition is not satisfied (e.g., the noise rate of the cluster is greater than or equal to the noise rate threshold level). In this example, in response to determining the second condition is not satisfied (e.g., the cluster is a noisy cluster), the processing logic can mark or flag the cluster as noisy and filter the noisy cluster from subsequent interfaces generated for display to the entity system.

In operation 460, the processing logic generates a user interface presenting the cluster and one or more cluster metrics. In an embodiment, the one or more cluster metrics or parameters are generated based on the collected search terms and related information in operation 410. As described above, the cluster metrics can include one or more metrics associated with a cluster, including but not limited to, the metrics illustrated in FIGS. 2 and 3. In an embodiment, the cluster metrics that are displayed via the interface can be filtered, selected or customized by a user (e.g., a user of the entity system). In an embodiment, since the first condition and the second condition were satisfied in operations 450 and 455, the cluster generated in block 430 is included by the processing logic for display via the interface.

In an embodiment, in operation 460, the processing logic can generate an interface that filters out or removes one or more clusters that fail to satisfy one or more of the first condition (e.g., the cluster is overlarge) or the second condition (e.g., the cluster has a noise rate that exceeds the noise rate threshold level).

Figure 5:
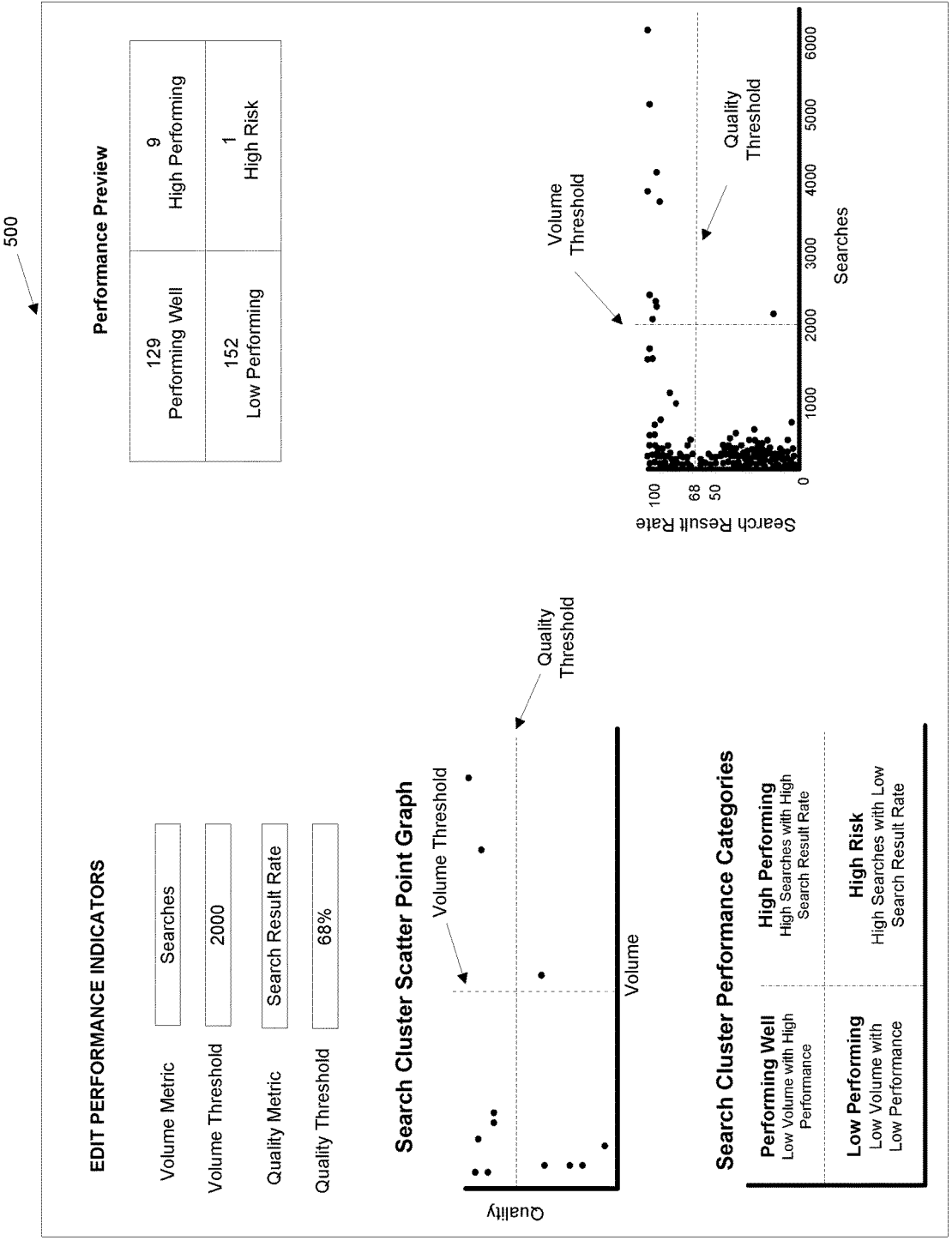
FIG. 5 illustrates an example interface of a search term management system including performance data relating to search term clusters associated with an entity, in accordance with one or more aspects of the disclosure.

FIG. 5 illustrates an example interface 500 generated by the display generator 118 of FIG. 1, according to embodiments of the present disclosure. FIG. 5 illustrates the example interface 500 including performance data generated by the search management system 100 of FIG. 1. As shown in FIG. 5, performance data associated with the clusters generated based on search terms associated with an entity is generated and presented to a user of the entity system.

In an embodiment, a user of the entity system can review the performance of the generated search terms clusters based on selectable and adjustable criteria or conditions. For example, an interface and associated cluster performance data can be generated based on a volume metric and a quality metric that can be set by the user. In the example shown the volume metric is set to "searches" (e.g., other metrics such as sessions, click through rate, etc. can be selected). In addition, a volume threshold level (e.g., 2,000 searches) can be set by the user to identify the performance data associated with the search term clusters that include at least 2,000 searches.

In an embodiment, the performance data can be generated based on a quality metric and associated quality threshold level that can be selected by the user. In this example, the quality metric is set to the "search result rate" and the quality threshold is set to 68%. Accordingly, the search term management system generates performance data to identify how the clusters compare to a threshold of 68% search result rate.

In this example, the search term management system generates a search cluster scatter point graph based on the volume metric, volume threshold, quality metric, and quality threshold. In an embodiment, the search term management system identifies a category for each of the identified clusters based on the quality metric and threshold. In this example, the categories include a first category of "performing well" clusters, a second category of "high performing" clusters, a third category of "low performing" clusters, and a fourth category of "high risk" clusters As shown in FIG. 5, the search term management system identifies an associated category for each of the clusters. In an embodiment, the search term management system generates a graph of clusters based on an associated number of searches (e.g., the volume metric on the X-axis) as a function of a corresponding search result rate (e.g., the quality metric on the Y-axis). As shown, the clusters are graphed and compared to the volume threshold and quality threshold to identify a corresponding category.

Advantageously, a user can adjust, change, or update one or more of the volume metric, volume threshold, quality metric, or quality threshold to enable the search term management system to categorize the clusters into corresponding performance groups. Based on the categorization of the clusters, the search term management system generates a "performance preview" summary identifying a number of clusters that are categorized in each of the aforementioned categories. In this regard, the search term management system determines how well a cluster is performing based on a selected volume threshold and a quality threshold which users can control to identify areas to improve an end users search experience.

For example, the search term management system can identify a cluster that is in the "high risk" category which indicates the cluster is receiving a high amount or volume of searches, but is not returning search results (e.g., has a low search result rate). Accordingly, the user of the entity system can identify a gap in the content (e.g., missing content) in a data structure including search result candidates that is causing the failure to generate a search result for the search terms of the cluster. In an embodiment, the gap in information or content can identified and remedied by the addition of content to address the gap and result in the provisioning of search results for search terms in this cluster.

In an embodiment, the search term management system (e.g., the cluster generator 116 of the search term management system 110 of FIG. 1) identifies one or more clusters associated with an increased level of change of one or more parameters over a period of time (herein referred to as "emerging clusters"). Advantageously, identification of the one or more emerging clusters by the search management system enables an entity system (e.g., entity system 170 of FIG. 1) to monitor and track changes and trends with respect to searching behavior of end user systems as it relates to the entity data. For example, identification of an emerging cluster associated with entity data can enable the entity system to detect and process changes or trends in the entity data of interest to the end-user systems based on search queries (e.g., questions from end-user systems including one or more search terms) received over a period of time.

In an embodiment, an emerging cluster can be identified from a set of generated clusters based on a determination that one or more parameters associated with a cluster satisfies one or more conditions. In an embodiment, the search management system can determine if a first cluster of a set of clusters generated as a result of a cluster generation process is to be identified as an emerging cluster based on an analysis of one or more cluster-related parameters. Advantageously, an interface including information associated with the one or more identified emerging clusters can be generated and provided to an entity system. In this regard, the entity system is able to observe and analyze end-user systems (e.g., customers or potential customers) search activity behavior changes relating to the entity data.

In an embodiment, the search management system determines a parameter of a cluster which represents a change in search volume associated with the cluster over a period of time. In an embodiment, the period of time can include an interval of time between a first time associated a first execution of a cluster generation process (e.g., also referred to as a cluster run) and a second time associated with a second (or next) execution of the cluster generation process. In an embodiment, each time a cluster run is performed, the search management system can determine a change in a value of the search volume parameter associated with the cluster at the time of the current cluster run as compared to the time of a previous or prior cluster run.

In an embodiment, the search management system can determine a change in search volume (e.g., a volume or quantity of searches conducted by end user systems) including search terms included in a particular cluster. In an embodiment, the search management system can determine a level or value of the first parameter (e.g., the difference or change in search volume during the period of time) for each of the set of clusters identified during an execution of the cluster generation process. In an embodiment, the search management system can determine if the respective parameter level (e.g., the change in search volume) satisfies a condition. In an embodiment, the condition is satisfied if an increased or positive change in search volume is greater than a threshold level. In an embodiment, if the parameter level of a cluster is greater than or equal to the parameter threshold level, then the search management system identifies the cluster as an emerging cluster. An example method executable by the search management system to identify an emerging cluster based on the change in search volume over a period of time is described below with reference to FIGS. 6 and 7.

In an embodiment, the search management system determines a parameter representing an amount or level (e.g., a percentage or ratio) of a set of search terms associated with a cluster that are identified as "new" relative to an aggregate set of search terms associated with a set of clusters identified in a previous cluster run. In this embodiment, a cluster is identified as an emerging cluster in response to determining the cluster is composed of a set of search terms that were submitted as part of end user queries for a first time as compared to a previous or last cluster run. In an embodiment, a cluster can be identified as an emerging cluster if that cluster includes greater than or equal to a threshold level (e.g., 20%) of search terms that were not part of an aggregate set of search terms associated with a set of clusters generated in a previous or prior cluster run. An example method executable by the search management system to identify an emerging cluster based on a level of new search terms included in the cluster based on a comparison of multiple cluster runs is described below with reference to FIGS. 7 and 8.

Figure 6:
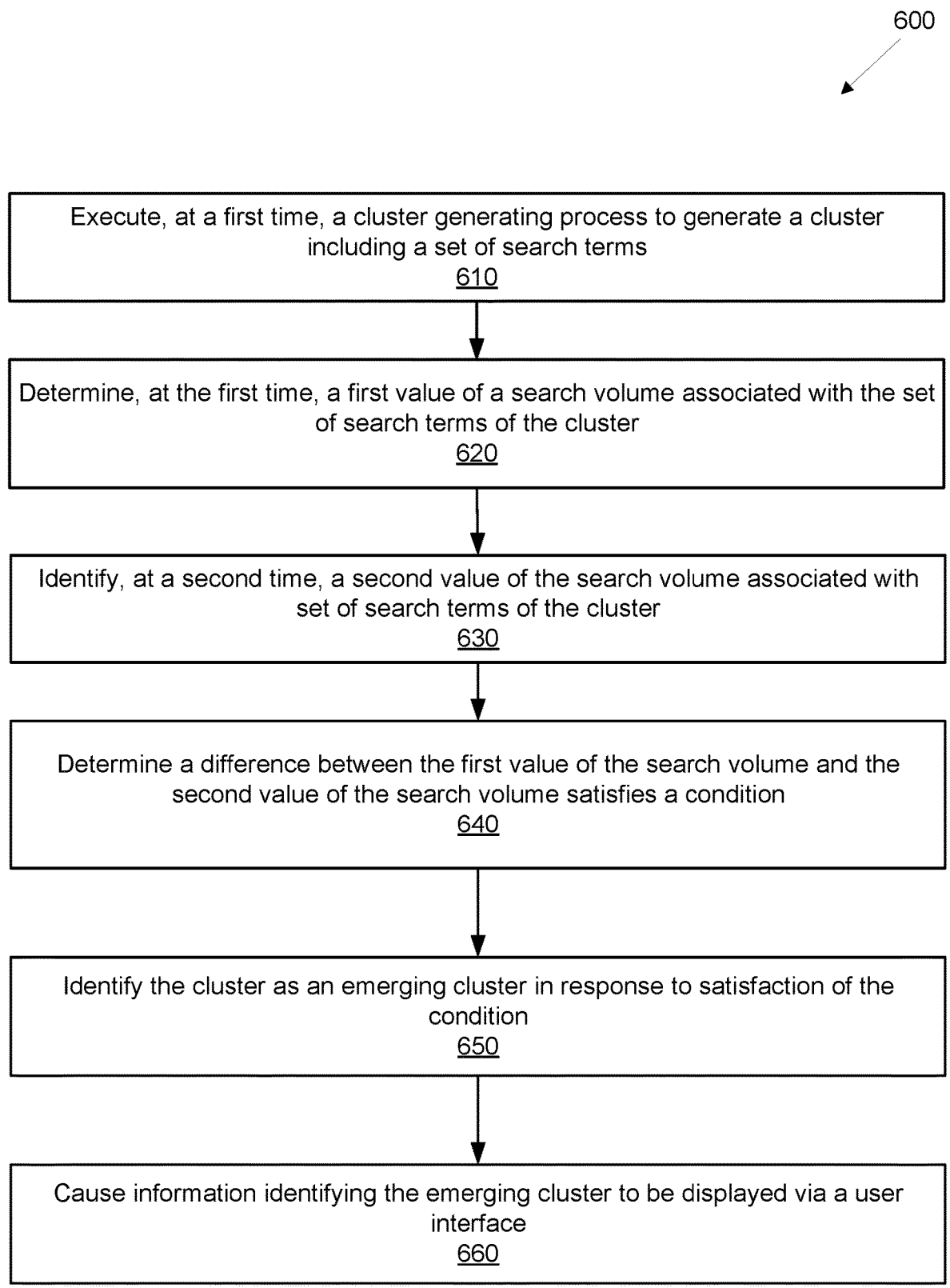
FIG. 6 illustrates an example method to generate an interface including an identified emerging cluster, in accordance with one or more aspects of the disclosure.

FIG. 6 illustrates a flow diagram relating to an example method 600 including operations performed by a search term management system (e.g., search term management system 110 of FIG. 1), according to embodiments of the present disclosure. It is understood that the flowchart of FIG. 6 provides an example of the many different types of functional arrangements that may be employed to implement the operation of the notification management component as described herein. Method 600 may be performed by a processing logic that may comprise hardware (e.g., circuitry, dedicated logic, programmable logic, microcode, etc.), software (e.g., instructions run on a processing device), or a combination thereof. In one embodiment, the search term management system executes the method 600 to identify, based on search volume data, a cluster of associated search terms as an emerging cluster for display via a user interface associated with an entity system.

In operation 610, the processing logic executes, at a first time, a cluster generating process to generate a cluster including a set of search terms. In an embodiment, at the first time, a first execution of the cluster generating process (e.g., the cluster generating process as described above in connection with FIGS. 1-5) or first cluster run is performed. In an embodiment, the first cluster run generates multiple clusters including the cluster (e.g., a first or target cluster) that is to be analyzed to determine if it qualifies as an emerging cluster.

Figure 7:
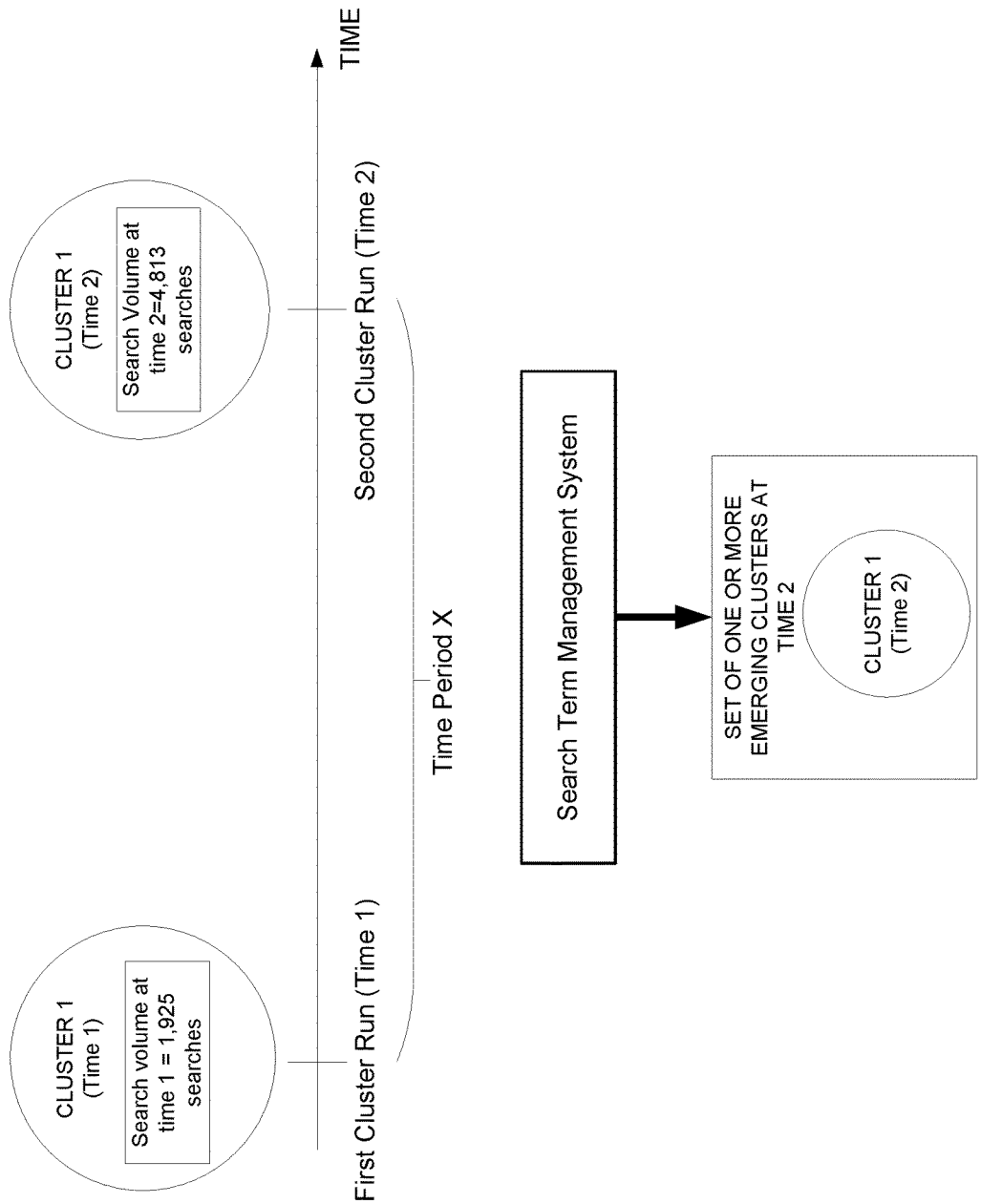
FIG. 7 illustrates example processing to identify one or more emerging clusters, in accordance with one or more aspects of the disclosure.

In operation 620, the processing logic determines, at the first time, a first value of a search volume associated with the set of search terms of the cluster. In an embodiment, the processing logic and identify one or more cluster metrics (as described above and shown in FIG. 3) associated with the cluster, including a cluster metric identifying a search volume associated with the set of search terms for the cluster. In an embodiment, the search volume (also referred to as a quantity of "searches") can represent a quantity of searches performed by end-user systems that included the respective search terms in the set of search terms in the cluster. For example, as shown in FIG. 7, at Time 1, a first cluster run is executed and generates Cluster 1. As shown, at Time 1, the processing logic determines the search volume associated with the search terms of Cluster 1 at Time 1. In an embodiment, the search volume at Time 1 reflects a quantity or number of searches using the respective search terms of the cluster as measured since a prior or previous cluster run. For example, the search volume at Time 1 reflects the quantity of searches associated with Cluster 1 identified during a time period since a previous cluster run. In the example shown in FIG. 7, the processing logic determines the first value of the search volume associated with Cluster 1 is 1,925 searches (e.g., 1,925 individual or unique search queries were submitted by end-user systems including the search terms Cluster 1 during a period of time since a previous cluster run).

In operation 630, the processing logic identifies, at a second time, a second value of the search volume associated with the set of search terms of the cluster. In an embodiment, at the second time, a second cluster run is executed and the one or more metrics of the cluster are determined. In an embodiment, the second time associated with the execution of the second cluster run occurs after a time interval following the first time associated with the execution of the first cluster run.

As shown in FIG. 7, at Time 2, the second cluster run is executed and generates an updated cluster set including Cluster 1. As shown in FIG. 7, there is a time interval or period (Time Period X) between the first cluster run at Time 1 and the second cluster run at Time 2. In an embodiment, the second value of the search volume is determined by calculating a quantity of searches associated with the search terms of the cluster that occurred during Time Period X. In the example shown in FIG. 7A, the processing logic determines the second value of the search volume associated with Cluster 1 is 4,813 searches (e.g., 4,813 individual or unique search queries were submitted by end-user systems including the search terms Cluster 1 during Time Period X).

In operation 640, the processing logic determines a difference between the first value of the search volume and the second value of the search volume satisfies a condition. In an embodiment, the condition (or rule) is satisfied if the difference between the search volumes (e.g., the change in search volume) increased by greater than or equal to a threshold level. In an embodiment, the threshold level can be represented as a percentage corresponding to a delta or level of change in the search volume associated with a cluster over a period of time between multiple cluster runs. For example, the threshold level can be set to 100%, such that the condition is satisfied if the second value represents a greater than or equal to 100% increase in search volume as compared to the first value.

In the example shown in FIG. 7, the threshold level is set to 100%. In this example, the search volume associated with Cluster 1 increased by approximately 150% and therefore satisfies the condition since the change in search volume increased by more than the threshold level. In an embodiment, the threshold level can be set or adjusted by an entity system to any suitable or desired value (e.g., 80%, 90%, 100%, 110%, etc.).

In operation 650, the processing logic identifies the cluster as an emerging cluster in response to satisfaction of the condition. In an embodiment, identification of the cluster as an emerging cluster can include electronically labeling or tagging the cluster with a designation indicating that it satisfied the condition associated with the emerging cluster categorization. As shown in FIG. 7, the processing logic of the search term management system identifies, at Time 2, a set of one or more emerging clusters including Cluster 1.

In operation 660, the processing logic causes information identifying the emerging cluster to be displayed via a user interface. In an embodiment, the processing logic generates a user interface identifying the emerging cluster. In an embodiment, the user interface can include a display or portion of a display that includes information that identifies the cluster as an emerging cluster. In an embodiment, the interface (e.g., interface 200 of FIG. 2) can include a filtering option to enable the entity user system to filter the set of clusters generated during a cluster run to identify or display a set of one or more emerging clusters identified in that set of clusters.

Figure 8:
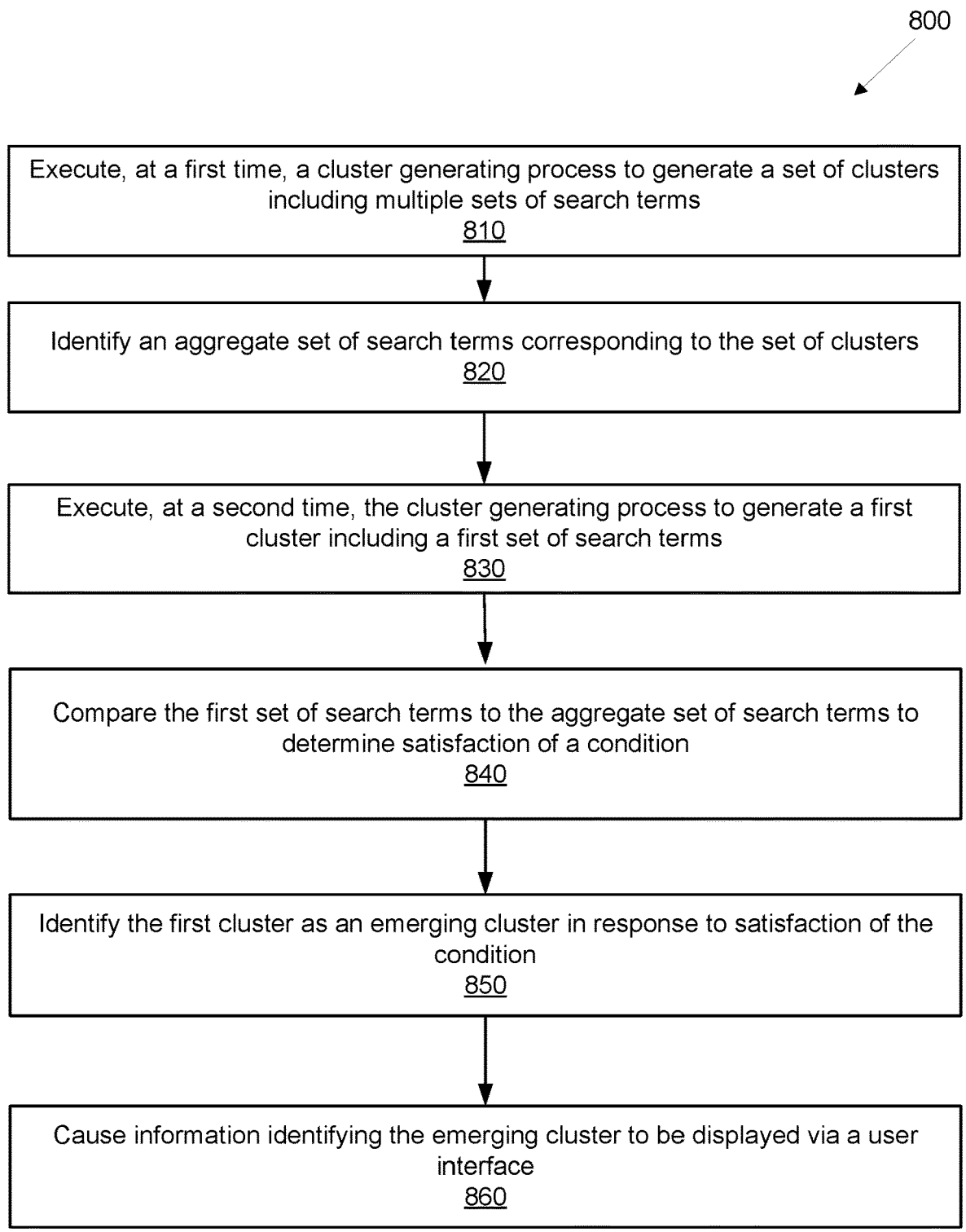
FIG. 8 illustrates an example method to generate an interface including an identified emerging cluster, in accordance with one or more aspects of the disclosure.

FIG. 8 illustrates a flow diagram relating to an example method 800 including operations performed by a search term management system (e.g., search term management system 110 of FIG. 1), according to embodiments of the present disclosure. It is understood that the flowchart of FIG. 8 provides an example of the many different types of functional arrangements that may be employed to implement the operation of the notification management component as described herein. Method 800 may be performed by a processing logic that may comprise hardware (e.g., circuitry, dedicated logic, programmable logic, microcode, etc.), software (e.g., instructions run on a processing device), or a combination thereof. In one embodiment, the search term management system executes the method 800 to identify, based on a comparison of search terms of multiple clusters, a cluster as an emerging cluster for display via a user interface associated with an entity system.

In operation 810, the processing logic executes, at a first time, a cluster generating process to generate a set of clusters including multiple sets of search terms. In an embodiment, at the first time, a first execution of the cluster generating process (e.g., the cluster generating process as described above in connection with FIGS. 1-5) or first cluster run is performed. In an embodiment, the first cluster run generates multiple clusters which each include a set of search terms.

Figure 9:
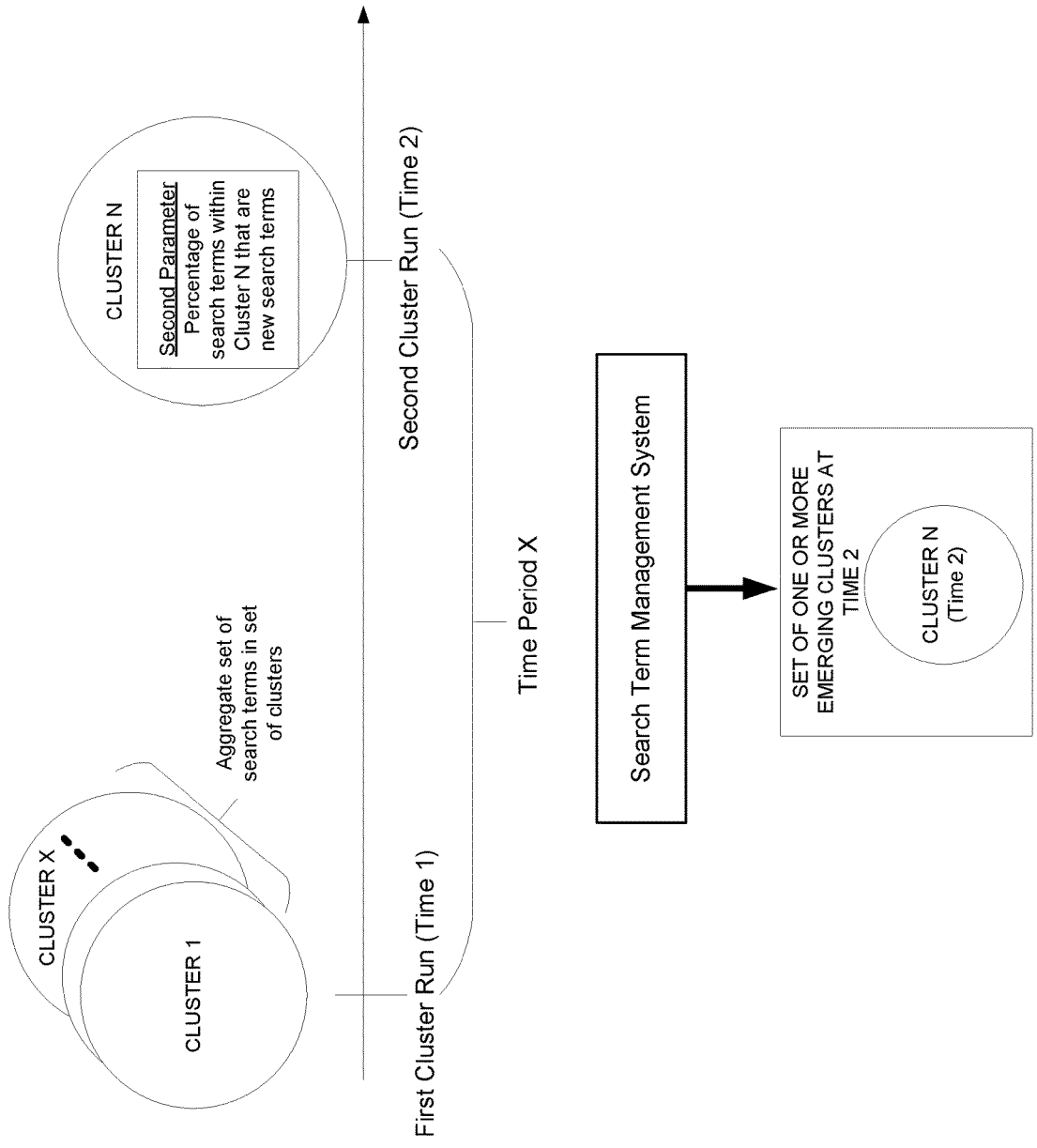
FIG. 9 illustrates example processing to identify one or more emerging clusters, in accordance with one or more aspects of the disclosure.

In operation 820, the processing logic identifies an aggregate set of search terms corresponding to the set of clusters. In an embodiment, the aggregate set of search terms can include all of the search terms included in the set of multiple clusters generated as a result of the first cluster run at the first time. FIG. 9 illustrates an example set of clusters (e.g., Cluster 1 . . . Cluster X) generated by a first run of the cluster generation process at Time 1. As shown in FIG. 9, an aggregate set of search terms corresponding to those clusters is identified. In an embodiment, the processing logic can store the aggregate set of search terms identified at the first time in a data store for subsequent processing, as described below.

In operation 830, the processing logic executes, at a second time, the cluster generating process to generate a first cluster including a first set of search terms. In an embodiment, the first cluster is a "new" cluster as compared to the set of clusters generated in the first cluster run (e.g., the first cluster is not included in the set of clusters generated at the first time). As shown in FIG. 9, the first cluster (Cluster N) is generated as a result of the second cluster run at Time 2.

In operation 840, the processing logic compare the first set of search terms to the aggregate set of search terms to determine satisfaction of a condition. In an embodiment, the condition (or rule) is satisfied if a percentage of the first set of search terms that are not included in the aggregate set of set terms is greater than or equal to a threshold level. In an embodiment, the threshold level can be represented as a percentage corresponding to a quantity of search terms in the first set of search terms that are not included in aggregate set of search terms. In an embodiment, the processing logic analyzes the first cluster to determine if the first cluster is composed of "new" search terms (e.g., search terms that were not included in the aggregate set of search terms) and represent searches that have been run for the first time since a previous cluster run.

In an embodiment, the threshold level associated with the condition can be set to any suitable percentage level, such as 20%. In the example shown in FIG. 9, the threshold level is set to 20%, and the processing logic determines that greater than or equal to 20% of the search terms of Cluster N (generated by the second cluster run at Time 2) are not in the aggregate set of search terms associated with the first cluster run, and therefore satisfies the condition. In an embodiment, the threshold level can be set or adjusted by an entity system to any suitable or desired value (e.g., 10%, 15%, 20%, 25%, etc.).

In operation 850, the processing logic identifies the first cluster as an emerging cluster in response to satisfaction of the condition. In an embodiment, identification of the first cluster as an emerging cluster can include electronically labeling or tagging the cluster with a designation indicating that it satisfied the condition associated with the emerging cluster categorization. In an embodiment, the first cluster is identified as an emerging cluster in view of the first cluster having at least the threshold level of search terms that were searched for a first time since the previous cluster run. As shown in FIG. 9, the processing logic of the search term management system identifies, at Time 2, a set of one or more emerging clusters including Cluster N.

In operation 860, the processing logic causes information identifying the emerging cluster to be displayed via a user interface. In an embodiment, the processing logic generates a user interface identifying the emerging cluster. In an embodiment, the user interface can include a display or portion of a display that includes information that identifies the cluster as an emerging cluster. In an embodiment, the interface (e.g., interface 200 of FIG. 2) can include a filtering option to enable the entity user system to filter the set of clusters generated during a cluster run to identify or display a set of one or more emerging clusters identified in that set of clusters.

In an embodiment, the method 600 of FIG. 6 and the method 800 of FIG. 8 can be executed together (e.g., as one method) to identify one or more emerging clusters. In an embodiment, for a particular cluster run (e.g., the second cluster run shown in FIGS. 7 and 9), the processing logic can analyze the generated clusters and apply the multiple conditions or rules associated with the multiple parameters (e.g., the search volume parameter and the new search term parameter) to identify a set of one or more emerging clusters. In an embodiment, a cluster (e.g., Cluster 1 of FIG. 7 and Cluster N of FIG. 9) can be identified as an emerging cluster if either of the conditions (e.g., the search volume condition of FIGS. 6 and 7 and the new search term condition of FIGS. 8 and 9) are satisfied.

Figure 10:
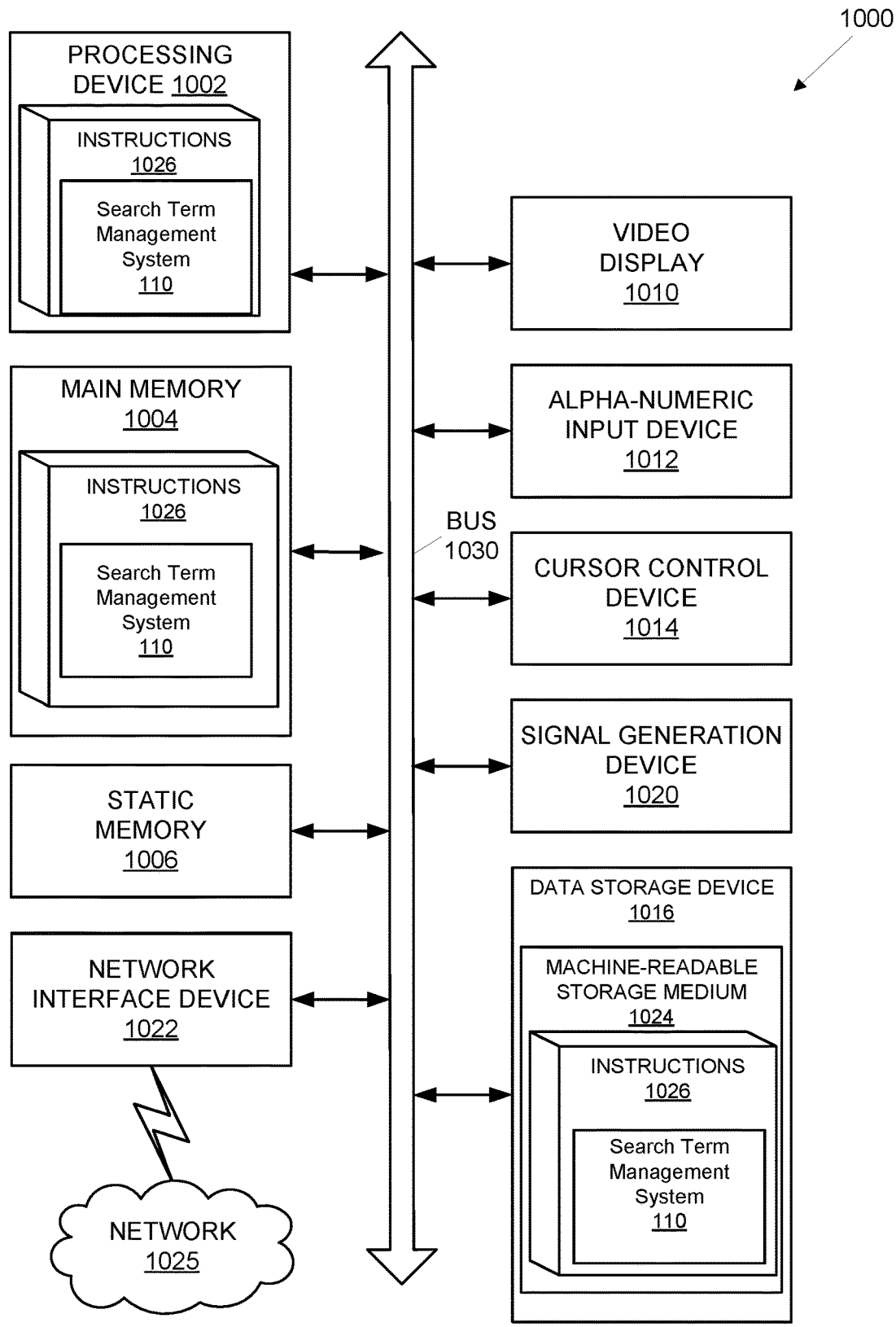
FIG. 10 illustrates an example computer system operating in accordance with one or more aspects of the disclosure.

FIG. 10 illustrates an example computer system 1000 operating in accordance with some embodiments of the disclosure. In FIG. 10, a diagrammatic representation of a machine is shown in the exemplary form of the computer system 1000 within which a set of instructions, for causing the machine to perform any one or more of the methodologies discussed herein, may be executed. In alternative embodiments, the computer system or machine 1000 may be connected (e.g., networked) to other machines in a local area network (LAN), an intranet, an extranet, or the Internet. The computer system or machine 1000 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that computer system 1000. Further, while only a single machine is illustrated, the term "machine" shall also be taken to include any collection of machines that individually or jointly execute a set (or multiple sets) of instructions to perform any one or more of the methodologies discussed herein.

The example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1016), which may communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute a search term management system for performing the operations and steps discussed herein. For example, the processing device 1002 may be configured to execute instructions implementing the processes and methods described herein, for supporting a search term management system, in accordance with one or more aspects of the disclosure.

Example computer system 1000 may further comprise a network interface device 1022 that may be communicatively coupled to a network 1025. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1020 (e.g., a speaker).

Data storage device 1016 may include a computer-readable storage medium (or more specifically a non-transitory computer-readable storage medium) 1024 on which is stored one or more sets of executable instructions 1026. In accordance with one or more aspects of the disclosure, executable instructions 1026 may comprise executable instructions encoding various functions of the search term management system 110 in accordance with one or more aspects of the disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1022.

While computer-readable storage medium 1024 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "routing," "identifying," "generating," "providing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A search term management method comprising:
   executing, at a first time, a cluster generating process, based on first search activity associated with an entity, to generate a plurality of clusters of search terms relating to an entity;
   identifying an aggregated set of search terms associated with the plurality of clusters;
   executing, at a second time, the cluster generating process, based on second search activity associated with the entity, to generate an additional cluster comprising a set of search terms relating to the entity;
   determining a subset of search terms of the additional cluster that are not included in the aggregated set of search terms associated with the plurality of clusters;
   determining a percentage of the subset of search terms of the additional cluster that are not included in the aggregated set of search terms of a total number of search terms in the aggregated set of search terms satisfies a first condition, wherein the first condition is satisfied when the percentage is greater than or equal to a threshold level;
   determining a size of the cluster satisfies a second condition, wherein the second condition is satisfied when the size of the cluster is less than a cluster size threshold;
   identifying, by a processing device, the cluster as an emerging cluster in response to satisfaction of the first condition and the second condition, wherein the emerging cluster is associated with a designation indicating that the emerging cluster satisfied the first condition and the second condition; and
   causing information identifying the emerging cluster to be displayed via a user interface, wherein the user interface comprises a filtering option to display one or more emerging clusters identified in the plurality of clusters.

2. The method of claim 1, wherein the threshold level is associated with a percentage of the subset of search terms compared to the aggregated set of search terms.

3. The method of claim 1, further comprising assigning a label to the additional cluster to designate the additional cluster as the emerging cluster.

4. The method of claim 1, further comprising calculating a quantity of search queries from a set of end user systems that relate to the plurality of clusters of search terms that occurred during a time period between the first time and the second time.

5. A system comprising:
   a memory to store instructions; and
   a processing device, operatively coupled to the memory, to execute the instructions to perform operations comprising:
      executing, at a first time, a cluster generating process, based on first search activity associated with an entity, to generate a plurality of clusters of search terms relating to an entity;
      identifying an aggregated set of search terms associated with the plurality of clusters;
      executing, at a second time, the cluster generating process, based on second search activity associated with the entity, to generate an additional cluster comprising a set of search terms relating to the entity;

determining a subset of search terms of the additional cluster that are not included in the aggregated set of search terms associated with the plurality of clusters;

determining a percentage of the subset of search terms of the additional cluster that are not included in the aggregated set of search terms of a total number of search terms in the aggregated set of search terms satisfies a first condition, wherein the first condition is satisfied when the percentage is greater than or equal to a threshold level;

determining a size of the cluster satisfies a second condition, wherein the second condition is satisfied when the size of the cluster is less than a cluster size threshold;

identifying, the cluster as an emerging cluster in response to satisfaction of the first condition and the second condition, wherein the emerging cluster is associated with a designation indicating that the emerging cluster satisfied the first condition and the second condition; and causing information identifying the emerging cluster to be displayed via a user interface, wherein the user interface comprises a filtering option to display one or more emerging clusters identified in the plurality of clusters.

6. The system of claim 5, wherein the threshold level is associated with a percentage of the subset of search terms compared to the aggregated set of search terms.

7. The system of claim 5, the operations further comprising assigning a label to the additional cluster to designate the additional cluster as the emerging cluster.

8. The system of claim 5, the operations further comprising calculating a quantity of search queries from a set of end user systems that relate to the cct of a plurality of clusters of search terms that occurred during a time period between the first time and the second time.

9. A non-transitory computer readable storage medium comprising instructions that, when executed by a processing device, cause the processing device to perform operations comprising:

executing, at a first time, a cluster generating process, based on first search activity associated with an entity, to generate a plurality of clusters of search terms relating to an entity;

identifying an aggregated set of search terms associated with the plurality of clusters;

executing, at a second time, the cluster generating process, based on second search activity associated with the entity, to generate an additional cluster comprising a set of search terms relating to the entity;

determining a subset of search terms of the additional cluster that are not included in the aggregated set of search terms associated with the plurality of clusters;

determining a percentage of the subset of search terms of the additional cluster that are not included in the aggregated set of search terms of a total number of search terms in the aggregated set of search terms satisfies a first condition, wherein the first condition is satisfied when the percentage is greater than or equal to a threshold level;

determining a size of the cluster satisfies a second condition, wherein the second condition is satisfied when the size of the cluster is less than a cluster size threshold;

identifying, the cluster as an emerging cluster in response to satisfaction of the first condition and the second condition, wherein the emerging cluster is associated with a designation indicating that the emerging cluster satisfied the first condition and the second condition; and causing information identifying the emerging cluster to be displayed via a user interface, wherein the user interface comprises a filtering option to display one or more emerging clusters identified in the plurality of clusters.

10. The non-transitory computer readable storage medium of claim 9, wherein the threshold level is associated with a percentage of the subset of search terms compared to the aggregated set of search terms.

11. The non-transitory computer readable storage medium of claim 9, the operations further comprising assigning a label to the additional cluster to designate the additional cluster as the emerging cluster.

12. The non-transitory computer readable storage medium of claim 9, the operations further comprising calculating a quantity of search queries from a set of end user systems that relate to the plurality of clusters of search terms that occurred during a time period between the first time and the second time.

* * * * *